Dec. 10, 1968  F. ROTHERMANN  3,414,974
MOUNT FOR DENTAL POSTHESIS

Filed Sept. 26, 1966  2 Sheets-Sheet 1

Fritz Rothermann
INVENTOR.

BY Karl F. Ross
Attorney

Dec. 10, 1968  F. ROTHERMANN  3,414,974
MOUNT FOR DENTAL POSTHESIS

Filed Sept. 26, 1966  2 Sheets-Sheet 2

Fritz Rothermann
INVENTOR.

BY Karl F. Ross
Attorney

United States Patent Office 3,414,974
Patented Dec. 10, 1968

3,414,974
MOUNT FOR DENTAL PROSTHESIS
Fritz Rothermann, Glarnischstrasse 28, Opfikon,
Glattbrugg, Switzerland
Filed Sept. 26, 1966, Ser. No. 581,850
Claims priority, application Switzerland, Nov. 10, 1965,
15,396/65
8 Claims. (Cl. 32—2)

My present invention relates to a mount for a dental prosthesis, such as a complete or a partial denture, which is to be anchored to the roots of natural teeth remaining in the patient's mouth.

It is known to insert a capped pin or post, generally of metal, into a root canal to form a support for the demountable attachment of a denture thereto. Conventional mounts of this description are, however, not fully satisfactory from the view-point of ease of attachment and security of retention. Also, the joints heretofore provided between the root caps and the denture often required considerable space, thus inconveniencing the patient during the insertion and removal of the prosthesis even where the mounting elements were receivable in recesses of the prosthetic teeth.

The general object of my invention, therefore, is to provide an improved mount for the purpose described which allows easy and convenient fastening as well as removal of the denture and which holds the latter firmly in place even when the number of available supporting roots is small.

A more particular object of this invention is to provide a mount of this character which rises only slightly above the root caps, preferably to an extent of approximately 1 mm.

I have found, in accordance with this invention, that the aforestated objects can be realized by the provision of a generally circular disk adapted to be mounted on the cap of a root-canal pin, e.g. by being soldered thereto, this disk having a peripheral groove of varying depth engageable by a split resilient ring which is rigid with a bar or other support for the denture proper and which has a gap at the point of greatest depth of the groove, the support being attached to the ring at the point of least depth diametrically opposite the aforementioned gap. The groove may be so shallow in the region of the denture support as to merge completely into the periphery of the disk at its point of least depth.

This arrangement enables the denture to be simply clipped onto its supporting posts by letting the rings snap into the peripheral grooves of the respective disks, each ring being advantageously of circular cross-section with a radius $r$ corresponding substantially to the greatest depth of the groove. The profile of the groove may be a semicircle of the same radius $r$ at the point of greatest depth or, if a certain amount of axial play is required between the ring and the disk, this profile may be defined by two quadrants substantially of radius $r$ separated by a straight line.

The invention will be described in greater detail with reference to the accompanying drawing in which.

Figure 5A:
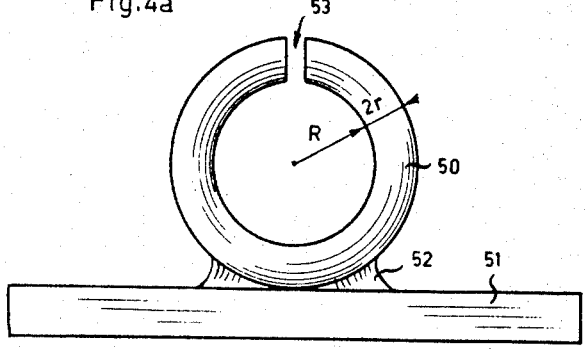
FIGS. 5a and 5b are, respectively, a face view and a side view of one of the rings of FIG. 2 together with an associated supporting bar.
Figure 5B:
Figure 6A:
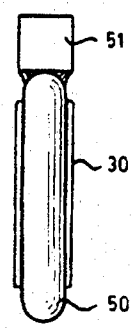
Figure 6B:
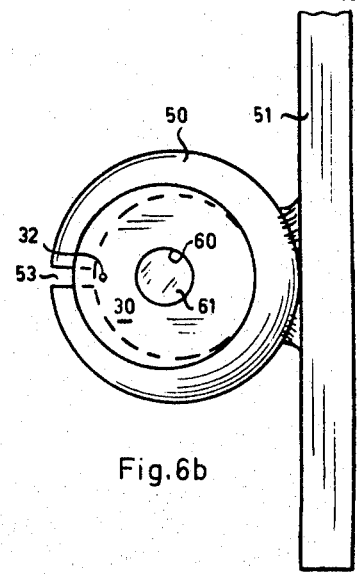
Figure 7:
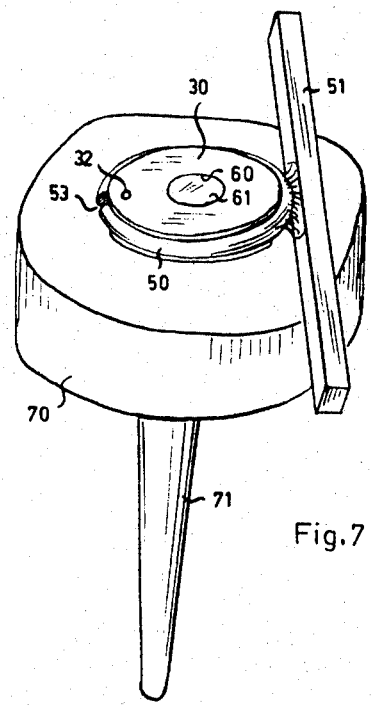

FIGS. 6a and 6b are, respectively, a side view and a face view of an assembly of the elements of FIGS. 3a, 3b and 5a, 5b; and FIG. 7 is a perspective view of the assembly of FIG. 6a and 6b attached to a root cap.

Figure 1:
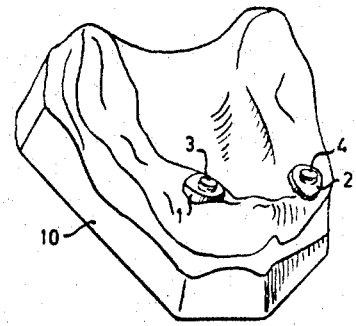
FIG. 1 is a perspective view of a plaster cast of a jaw having a pair of natural roots, the cast including peripherally grooved mounting disks according to the invention soldered onto corresponding root-pin caps.

In FIG. 1 I have shown a plaster cast 10 of a jaw, having imbedded therein a pair of root-canal pins or posts with caps 1, 2 to which respective disks 3, 4 of hard gold have been secured in a manner fully described hereinafter.

Figure 2:
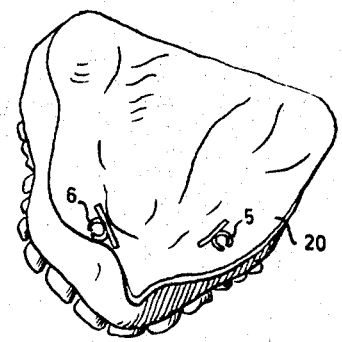
FIG. 2 is a perspective view of the underside of a denture provided with a pair of mounting rings engageable with the disks of FIG. 1.

FIG. 2 illustrates a corresponding dental prosthesis 20 bearing mounting elements 5, 6 respectively engageable with the disks 3, 4 of FIG. 1.

Figure 3A:
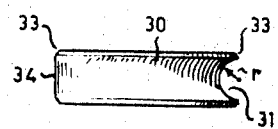
FIGS. 3a and 3b are, respectively, a side view and a top view of one of the mounting disks of FIG. 1.
Figure 3B:
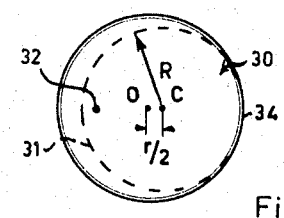

In FIGS. 3a and 3b I have shown a disk 30 representing, on a larger scale, either of the disks 3, 4 of FIG. 1. Disk 30 has a peripheral groove 31 whose center C is offset by a distance $r/2$ from the axis O of the disk, $r$ being the radius of the semi-cylindrical groove profile at the point of greatest depth (i.e. at the right in FIG. 3a). This point of greatest depth is conveniently indicated by a visible mark 32 on the exposed face of the disk. The radius of the disk exceeds by $r/2$ the radius R of the periphery of groove 31 so that this groove flattens out completely at a point 34 (on the left in FIG. 3a) diametrically opposite the mark 32.

Figure 4A:
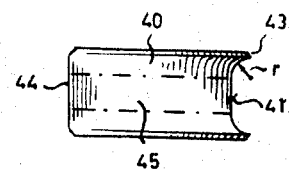
FIGS. 4a and 4b are views similar to FIGS. 3a and 3b, respectively, showing a modification of the mounting disk.
Figure 4B:
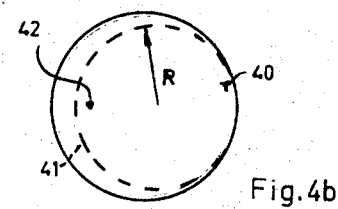

In FIGS. 4a and 4b I have shown a generally similar disk 40 whose groove 41 differs from groove 31 of the preceding embodiment in that its profile at the point of greatest depth consists of two quadrants of radius $r$ separated by a straight line so that the groove has a cylindrical zone 45.

The grooves 31 and 41 are shown flanked by a pair of flanges 33 and 43, respectively, and the length of radius $r$ may be on the order of ½ mm. in either case. The mask showing the location of greatest depth has been designated 42 in FIG. 4b.

FIGS. 5a and 5b show one of the two mounting elements 5 and 6 of FIG. 2 on a larger scale. This mounting element comprises a wire ring 50 of temperable steel, preferably made from hard gold, of inner radius R and outer radius $R+2r$, the profile of the ring being circular with radius $r$. Ring 50 is split to form a gap 53 so that it can be resiliently slipped around the associated disk 30, with the gap 53 located at the point of greatest depth defined by mark 32 or 42; see FIGS. 6a and 6b. A bar 51 is soldered to the ring 50 at 52 so as to be tangent to that ring at a point diametrically opposite the gap 53. Thus, the connection 52 comes to rest adjacent the shallow part 34 (FIG. 3a) or 44 (FIG. 4a) of the engaged disk 30 or 40.

In FIG. 7 I have shown a convenient way of permanently attaching the disk 30 to a cap 70 whose root-canal pin has been illustrated at 71. The disk 30 has been provided here (see also FIG. 6b) with a center hole 60 into which a blob of solder 61 has been introduced for securing the disk to the cap of post 70.

As illustrated in FIG. 2, the supporting bars of the elements 5 and 6 may be inclined at an acute angle to each other to resist spontaneous detachment of the denture 20 from its supporting posts. The denture can, however, be readily disengaged by axial pressure upon the mounting rings which will free them from their associated disks.

It may be mentioned that the disk configuration of FIG. 3a is preferred where a relatively large number of supporting roots are available, the denture then resting exclusively on these roots at a fixed level. If only a few such roots are present, the denture must be partly supported by the gums so that a certain amount of play, as afforded by the profile of FIG. 4a, will be desirable.

I claim:

1. A separable mount for anchoring a denture on roots of natural teeth, comprising a generally circular disk adapted to be mounted on a cap of a root-canal pin, said disk having a peripheral groove of varying depth, a split resilient ring removably received in said groove with a gap at the point of greatest depth of said groove, and a denture support rigidly attached to said ring at the point of least depth of said groove diametrically opposite said point of greatest depth.

2. A mount as defined in claim 1 wherein said groove merges into the periphery of said disk at said point of least depth.

3. A mount as defined in claim 2 wherein the cross-section of said ring is a circle of radius $r$ and the greatest depth of said groove is substantially equal to $r$.

4. A mount as defined in claim 3 wherein the profile of said groove at said point of greatest depth is substantially a semicircle of radius $r$.

5. A mount as defined in claim 3 wherein the profile of said groove at said point of greatest depth is defined by two quadrants substantailly of radius $r$ separated by a straight line.

6. A mount as defined in claim 1 wherein said denture supoprt is an elongated bar extending substantially tangentially of said ring.

7. The combination of a mount as defined in claim 1 with a root-canal pin having a cap fixedly supporting said disk.

8. The combination defined in claim 7 wherein said disk has a center hole containing a blob of solder whereby said disk is fastened to said cap.

References Cited

UNITED STATES PATENTS

| | | | |
|---|---|---|---|
| 711,324 | 10/1902 | Lacy | 32—2 |
| 2,112,007 | 3/1938 | Adams | 32—2 |
| 2,916,766 | 12/1959 | Barbanotti | 32—3 XR |

LOUIS G. MANCENE, *Primary Examiner.*

R. PESHOCK, *Assistant Examiner.*